(12) United States Patent
Ferderer et al.

(10) Patent No.: US 12,244,107 B2
(45) Date of Patent: Mar. 4, 2025

(54) ADD-ON HOUSING OF AN ELECTRICAL CONNECTOR

(71) Applicant: HARTING ELECTRIC STIFTUNG & CO. KG, Espelkamp (DE)

(72) Inventors: Albert Ferderer, Espelkamp (DE); Heiko Meier, Minden (DE); Florian Hackemeier, Rahden (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 358 days.

(21) Appl. No.: 17/795,482

(22) PCT Filed: Jan. 18, 2021

(86) PCT No.: PCT/DE2021/100051
§ 371 (c)(1),
(2) Date: Jul. 26, 2022

(87) PCT Pub. No.: WO2021/151426
PCT Pub. Date: Aug. 5, 2021

(65) Prior Publication Data
US 2023/0089829 A1   Mar. 23, 2023

(30) Foreign Application Priority Data

Jan. 27, 2020 (DE) ..................... 10 2020 101 812.6

(51) Int. Cl.
*H01R 13/52* (2006.01)
*F16B 21/08* (2006.01)
(Continued)

(52) U.S. Cl.
CPC ......... *H01R 13/745* (2013.01); *F16B 21/086* (2013.01); *H01R 13/518* (2013.01); *H01R 13/5202* (2013.01); *H01R 13/62966* (2013.01)

(58) Field of Classification Search
CPC ................ H01R 13/745; H01R 13/518; H01R 13/5202; H01R 13/62966; F16B 21/086
(Continued)

(56) References Cited

U.S. PATENT DOCUMENTS 5,238,427 A * 8/1993 Fry ...................... H01R 13/745
248/231.9
5,263,871 A * 11/1993 Sano ................ H01R 13/62933
439/549

(Continued)

FOREIGN PATENT DOCUMENTS

DE   34 06 741 A1   8/1985
DE   42 28 531 C2   10/1995
(Continued)

OTHER PUBLICATIONS

International Preliminary Report on Patentability, mailed Jul. 28, 2022, for International Application No. PCT/DE2021/100051, 8 pages.

(Continued)

*Primary Examiner* — Abdullah A Riyami
*Assistant Examiner* — Vladimir Imas
(74) *Attorney, Agent, or Firm* — Seed IP Law Group LLP

(57) ABSTRACT

An add-on housing is provided comprising a frame-shaped basic shape which encloses a receiving region for receiving a contact insert or a holding frame fitted with plug-in connector modules, wherein at least two fastening surfaces having fastening openings are integrally formed on the outside of the frame-shaped basic shape, wherein the add-on housing has snap-fastening means or devices which engage through the fastening openings in order to mechanically fasten the add-on housing to a through-hole in a device wall. A method for fastening an add-on housing to a through-hole in a device wall is also provided, wherein: the add-on
(Continued)

housing has fastening openings which are in alignment with corresponding fastening openings in the device wall; snap-fastening means or devices having a box-shaped main body and having opposing and resiliently mounted base portions laterally protruding from said main body are inserted into the mutually aligned fastening openings in the add-on housing and the device wall; the base portions, upon insertion into the fastening openings, are first pressed into the box-shaped main body and then extend to engage the device wall.

8 Claims, 2 Drawing Sheets

(51) Int. Cl.
    *H01R 13/518* (2006.01)
    *H01R 13/629* (2006.01)
    *H01R 13/74* (2006.01)

(58) Field of Classification Search
    USPC .......................................................... 439/282
    See application file for complete search history.

(56) References Cited

U.S. PATENT DOCUMENTS

| | | | | |
|---|---|---|---|---|
| 5,320,437 A * | 6/1994 | Malke | ........................ | B41J 3/36 400/208 |
| 5,338,194 A * | 8/1994 | Strohmaier | ............ | A61G 15/14 604/27 |
| 6,319,022 B1 * | 11/2001 | Hwang | .............. | H01R 12/7029 439/79 |
| 6,593,531 B2 * | 7/2003 | Hulsmann | ................ | F16L 45/00 174/67 |
| 6,846,165 B2 * | 1/2005 | Wanschura | ................ | F04B 1/16 91/499 |
| 9,429,051 B2 * | 8/2016 | Meneely | .................. | F02D 13/04 |
| 9,562,448 B2 * | 2/2017 | Meneely | .................. | F01L 1/181 |
| 9,583,875 B2 * | 2/2017 | Griepenstroh | ... | H01R 13/62927 |
| 10,439,325 B2 * | 10/2019 | Kritter | ............. | H01R 13/62966 |
| 10,601,178 B2 * | 3/2020 | Spilker | .................. | H01R 43/26 |
| 11,095,073 B2 * | 8/2021 | Spilker | ............... | H01R 13/62955 |
| 11,482,819 B2 * | 10/2022 | Kliever | ............... | H01R 13/518 |
| 2009/0098768 A1 * | 4/2009 | Giefers | ................ | H01R 13/743 439/552 |
| 2016/0108940 A1 * | 4/2016 | Kritter | ............. | H01R 13/62938 403/409.1 |
| 2018/0123281 A1 * | 5/2018 | Griepenstroh | ..... | H01R 13/5213 |

FOREIGN PATENT DOCUMENTS

DE    10 2015 106 963 B4    11/2019
EP           012 922 A1    4/2016

OTHER PUBLICATIONS

International Search Report and Written Opinion, mailed Mar. 24, 2021, for International Patent Application No. PCT/DE2021/100051. (12 pages) (with English translation of International Search Report).

Office Action, dated Oct. 16, 2020, for German Patent Application No. 10 2020 101 812.6 (6 pages).

* cited by examiner

ADD-ON HOUSING OF AN ELECTRICAL CONNECTOR

BACKGROUND

Technical Field

The present disclosure relates to add-on housings and methods of installing add-on housings. Such add-on housings are used in the industrial environment. The add-on housings accommodate a contact insert or a retention frame which is provided with plug-type connector modules and which supplies relevant devices with electrical energy and/or signals.

Description of the Related Art

DE 10 2015 106 963 B4 sets out an add-on housing which is fastened to a device wall and which has at the narrow sides thereof in each case fastening faces each having two screw openings for fixing the add-on housing to the device wall. Such screw fastenings are difficult to handle both during installation and during maintenance of the device. Nonetheless, they have been used for decades.

The German Patent and Trademark Office has in the priority application relating to the present application researched the following prior art: DE 42 28 531 C2, U.S. Pat. No. 6,319,022 B1, DE 34 06 741 A1 and DE 10 2015 106 963 B4.

BRIEF SUMMARY

Embodiments of the invention provide an add-on housing which can be installed and maintained in a simple manner.

The add-on housing according to one or more embodiments of the invention has a frame-like basic shape having a rectangular cross section. The circumferentially raised frame wall extends substantially perpendicularly to the device wall.

The add-on housing has a receiving region for receiving a contact insert or a retention frame which is provided with plug-type connector modules. This receiving region is surrounded or protected by the above-mentioned frame wall. The receiving region can be closed by way of a housing cover when no plug-type connector is connected.

The add-on housing may have a locking bracket via which a connected plug-type connector can be fixed in a reversible manner.

At least two fastening faces with fastening openings are formed on the frame-like basic shape of the add-on housing. Advantageously, the fastening faces may be provided on narrow sides of the add-on housing.

The add-on housing has snap-fastening means or devices which, in order to mechanically fasten the add-on housing to a wall aperture of a device wall, engage through the fastening openings. With the snap-fastening means or devices, the add-on housing can be mounted on a device wall in a tool-free manner. For maintenance purposes, the add-on housing can be easily removed from the device wall again and subsequently just as easily fastened thereto again.

In an advantageous embodiment of the invention, the snap-fastening means or devices each have a case-like base member having a rectangular cross section. From mutually opposing narrow faces of the case-like base member, resiliently supported base portions protrude. When the snap-fastening means or devices are introduced completely into the fastening openings, the base portions engage the device wall, whereby the add-on housing is secured to the device wall.

A resilient force is directed in such a manner that the base portions are urged or pressed constantly out of the case-like base member. If the base portions are pressed counter to the resilient force into the case-like base member of the snap-fastening means or devices, the add-on housing can be removed from the device wall again.

In some instances, the snap-fastening means or devices have a mechanism which is accessible via an outwardly directed face thereof and by way of which the base portions, counter to the resilient force, can be guided inward (back into the case-like member). The add-on housing can thereby be removed from the device wall again without having to access the inner side of the device. This further increases the maintenance-friendliness of the add-on housing according to aspects of the invention.

In some instances, the fastening openings of the add-on housing, in a similar manner to the cross section of the snap-fastening means or devices, are constructed in a rectangular manner. In this instance, the fastening opening is configured to be only slightly larger than the cross section of the snap-fastening means or devices. Such fastening openings can be produced in a technically simple manner in production terms, for example, by way of punching.

Advantageously, the fastening openings each have a circumferential seal so that undesirable media, such as dust and water, cannot be introduced inside the device.

In some instances, the base portions each have a first inclined face and a second inclined face. The portion of the base portions which can be seen from the outer side is consequently substantially triangular in cross section. In the completely introduced, locked state, the second inclined face is supported internally on the device wall. In this instance, the second inclined face is oriented at an acute angle with respect to the device wall. As a result of the above-described operational connection of the base portion to a spring, a force which is directed substantially outward (orthogonally with respect to the device wall) is permanently applied by the base portion to the device wall, whereby a secure fixing of the add-on housing is ensured.

Via the first inclined face, the base portion, when the snap-fastening means or devices is introduced into the fastening opening, is pressed into the case-like base-member. It is therefore advantageous for the first inclined face to be at a more obtuse angle with respect to the device wall than the second inclined face.

The above-described add-on housing is installed on a device wall as follows: firstly, the fastening openings of the add-on housing are orientated in alignment with corresponding fastening openings in the device wall. Subsequently, snap-fastening means or devices are introduced into the mutually aligned fastening openings.

During introduction, the first inclined face of the base portion initially slides along an associated edge of the fastening opening. In this instance, the respective base portion is pressed counter to the action of the resilient force into the case-like housing member of the snap-fastening means or device. After the snap-fastening means or device has been introduced completely into the fastening opening, the respective base portion snaps back. The second inclined face is then supported on the device wall.

The base portions can be pressed inside the case-like base member manually or by way of a mechanism. The snap-fastening means or devices can then be removed from the fastening openings and the add-on housing can be removed from the device wall.

BRIEF DESCRIPTION OF THE SEVERAL VIEWS OF THE DRAWINGS

An embodiment of the invention is illustrated in the drawings and is explained in greater detail below. In the drawings.

The Figures may contain partially simplified, schematic illustrations. Sometimes, for elements which are similar but where applicable not identical, identical reference numerals may be used. Different views of the same elements may be drawn to different scales.

DETAILED DESCRIPTION

Figure 1:
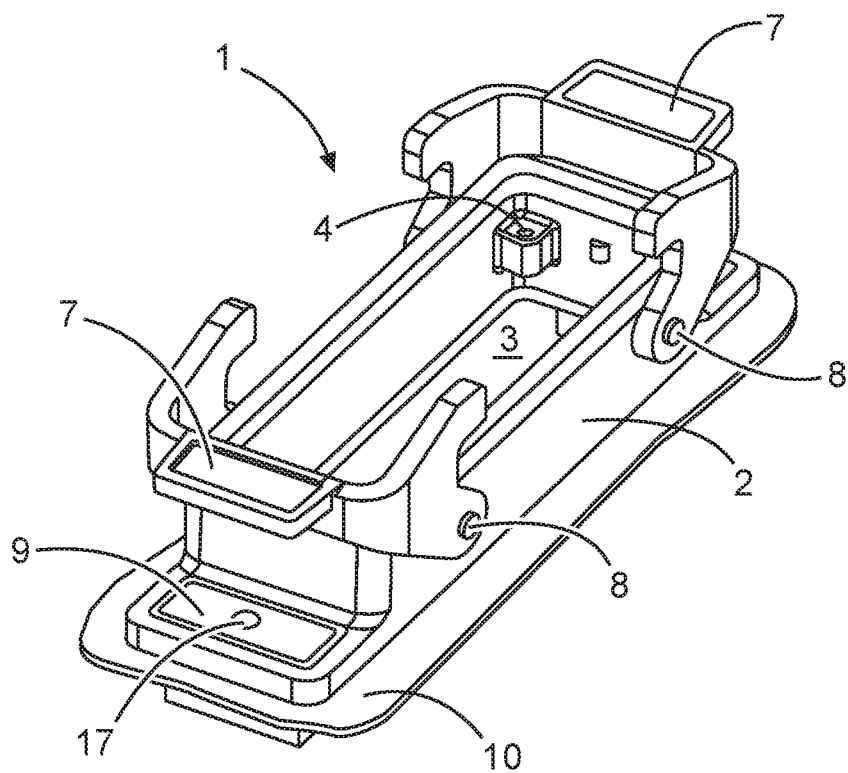
FIG. 1 shows a perspective illustration of an add-on housing according to an embodiment of the invention.

FIG. 1 is a perspective view of an add-on housing 1 according to an embodiment of the invention. The add-on housing 1 has a frame-like basic shape 2 having a receiving region 3. A contact insert or a retention frame which is provided with plug-type connector modules is fastened in the receiving region 3. To this end, screw openings 4 are provided in the corner regions of the receiving region 3. For reasons of depiction, no contact insert or equipped retention frame is shown in the Figures.

Two fixing flanges are formed on the frame-like basic shape 2. A rectangular fastening opening 6 is provided in each case in fastening faces 5 of the fixing flanges. The fastening faces 5 protrude at the outer side from the frame-like basic shape 2 and are arranged substantially perpendicularly relative thereto.

In an upper region of narrow sides of the frame-like basic shape 2, locking brackets 7 are pivotably supported on journals 8 which are formed on the wide sides.

Figures 2, 3:
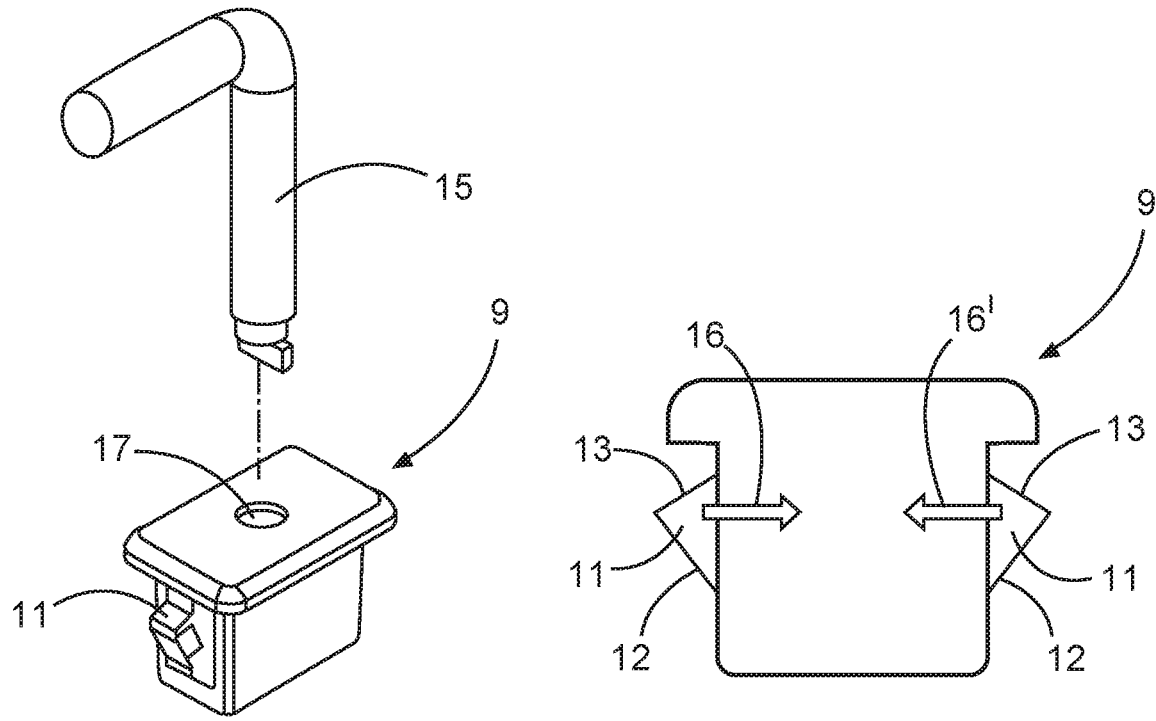
FIG. 2 shows a perspective illustration of a snap-fastening means or device.
FIG. 3 shows a simplified side view of the snap-fastening means or device.

FIGS. 2 and 3 show snap-fastening means or devices 9 by way of which the add-on housing 1 can be reversibly fastened to a device wall 10. The outwardly facing face of a case-like base member has a tool opening 17. By inserting a tool 15 into this tool opening 17, base portions 11, via a mechanism which is not shown, can be returned inside the base member in the direction of the arrows 16, 16' of FIG. 3. Subsequently, the add-on housing 1 can be removed from the device wall 10. As a tool 15, for example, it is possible to use commercially available screwdrivers or Allen keys, which most industrial mechanics will always have on hand.

Figure 4:
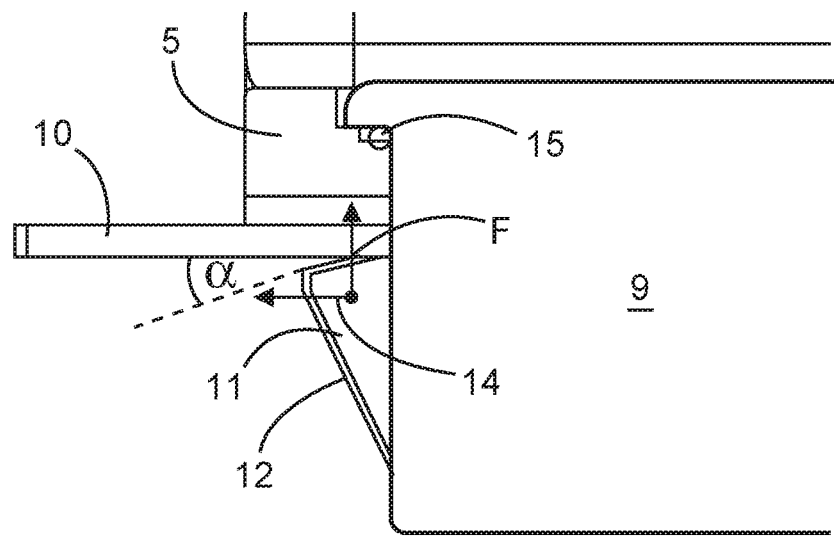
FIG. 4 shows a sectioned illustration of the add-on housing in the fastening region.
Figure 5:
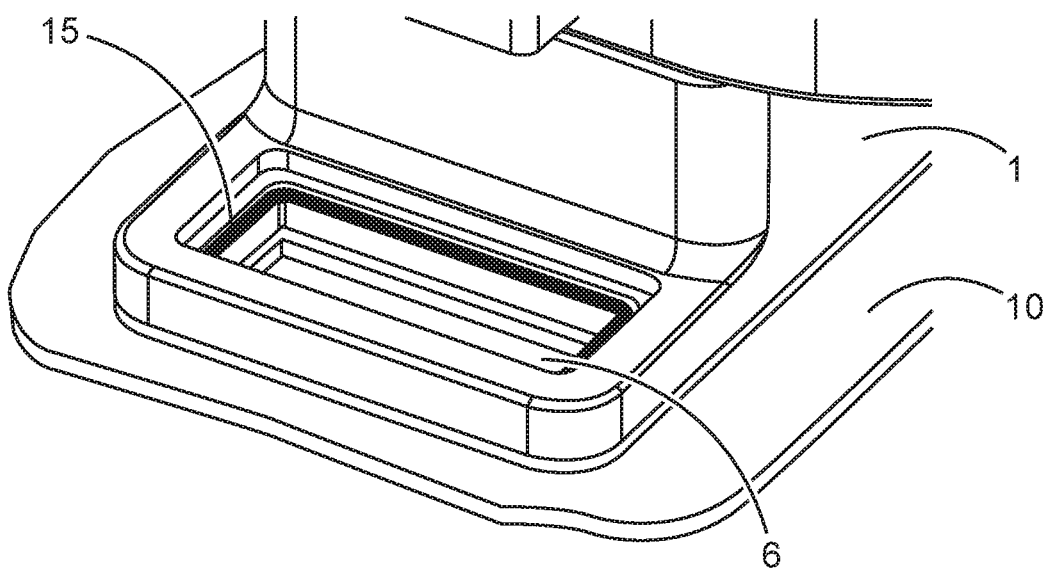
FIG. 5 shows a perspective sectioned illustration of the add-on housing in the fastening region without snap-fastening means or devices installed.

FIG. 4 shows a sectioned illustration of the add-on housing 1 in a fastening region. When the add-on housing 1 is secured to a device wall 10, snap-fastening means or devices 9 are arranged in the fastening openings 6. There are provided in the fastening opening 6 seals which prevent media from being introduced into the device housing.

The snap-fastening means or devices 9 have a case-like base member, wherein resiliently supported base portions 11, which are configured to engage the device wall 10, protrude from mutually opposing narrow faces of the case-like base member. The base portions 11 each have a first inclined face 12 and a second inclined face 13, wherein the second inclined face 13, in the fixed state, is supported on or engage with the device wall 10.

In the fixed state, the device wall 10 and the second inclined face 13 are located at an acute angle α with respect to each other. As a result of the resilient support of the base portions 11, they are constantly pressed outward in the direction of the arrow 14 in FIG. 4. The second inclined face 13 thereby permanently presses with a resulting force in the direction of the arrow F against the device wall 10. A secure fixing of the add-on housing 1 to the device wall 10 is thereby ensured.

As a result of a change of the angle α or the inclined face 13, the tolerance range of the pressing force can be both increased and decreased. As a result of the pretensioning force of the spring, the pressing force of the add-on housing 1 against the housing or device wall 10 can also be varied.

Even if various aspects or features of the embodiments of the invention are shown in combination in each case in the Figures, it is evident to the person skilled in the art—unless stated otherwise—that the combinations illustrated and discussed are not the only ones possible. In particular, mutually corresponding units or feature complexes from various embodiments can be mutually interchanged. In other words, aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An add-on housing having a frame-like basic shape which surrounds a receiving region for receiving a contact insert or a retention frame which is provided with plug-type connector modules,
    wherein at least two fastening faces having fastening openings are formed on the frame-like basic shape,
    wherein the add-on housing has snap-fastening devices which, in order to mechanically fasten the add-on housing to a wall aperture of a device wall, engage through the fastening openings, and
    wherein each of the snap-fastening devices has a case-like base member, and wherein resiliently supported base portions protrude from mutually opposing narrow faces of the case-like base member to engage the device wall.

2. The add-on housing as claimed in claim 1, wherein the fastening faces are formed on narrow sides of the add-on housing.

3. The add-on housing as claimed in claim 1, wherein the fastening openings are constructed in a rectangular manner.

4. The add-on housing as claimed in claim 1, wherein the fastening openings each have a circumferential seal.

5. The add-on housing as claimed in claim 1, wherein each of the snap-fastening devices has a mechanism which is accessible via an outwardly directed face thereof and by way of which the base portions can be guided in the case-like base member.

6. An add-on housing having a frame-like basic shape which surrounds a receiving region for receiving a contact insert or a retention frame which is provided with plug-type connector modules,
    wherein at least two fastening faces having fastening openings are formed on the frame-like basic shape, wherein the add-on housing has snap-fastening devices which, in order to mechanically fasten the add-on housing to a wall aperture of a device wall, engage through the fastening openings, wherein each of the snap-fastening devices has base portions that are configured to engage the device wall, and wherein the base portions each have a first inclined face and a second inclined face, and wherein the second inclined face is configured to engage the device wall.

7. The add-on housing as claimed in claim 6, wherein the second inclined face is oriented at an acute angle with respect to the device wall.

8. A method for fastening an add-on housing to a wall aperture of a device wall, wherein the add-on housing has fastening openings which are in alignment with corresponding fastening openings in the device wall, the method comprising:

introducing snap-fastening devices in the mutually aligned fastening openings of the add-on housing and the device wall, each of the snap-fastening devices having a case-like base member and laterally protruding, mutually opposing and resiliently supported base portions, wherein, during introduction of the snap-fastening devices into the mutually aligned fastening openings, the base portions are initially pressed into the case-like base member and then subsequently extend to engage the device wall, and wherein the base portions each have a first inclined face and a second inclined face, and wherein, during introduction of the snap-fastening devices into the mutually aligned fastening openings, the first inclined face initially slides along an edge of a respective one of the fastening openings and the second inclined face subsequently engages the device wall.

* * * * *